(12) United States Patent
Dateki (10) Patent No.: US 8,072,916 B2
(45) Date of Patent: Dec. 6, 2011

(54) MOBILE WIRELESS COMMUNICATION SYSTEM AND WIRELESS COMMUNICATION APPARATUS USING TRANSMISSION POWER CONTROL INFORMATION

(75) Inventor: Takashi Dateki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 296 days.

(21) Appl. No.: 11/114,817

(22) Filed: Apr. 26, 2005

(65) Prior Publication Data

US 2006/0171342 A1    Aug. 3, 2006

(30) Foreign Application Priority Data

Jan. 14, 2005    (JP) .................................. 2005-007508

(51) Int. Cl.
*H04B 7/185*    (2006.01)
(52) U.S. Cl. ........ 370/318; 370/332; 370/333; 370/342; 370/441
(58) Field of Classification Search .................... 455/69, 455/70, 88, 522; 370/342, 441, 318, 332, 370/333
See application file for complete search history.

(56) References Cited

U.S. PATENT DOCUMENTS

| | | | | |
|---|---|---|---|---|
| 6,374,118 | B1 * | 4/2002 | Toskala et al. ................ | 455/522 |
| 6,611,508 | B1 | 8/2003 | Abe | |
| 6,647,005 | B1 * | 11/2003 | Cao et al. ..................... | 370/342 |
| 6,980,808 | B1 * | 12/2005 | Smith .......................... | 455/450 |
| 2002/0018527 | A1 * | 2/2002 | Vanderaar et al. ............ | 375/259 |
| 2003/0081586 | A1 * | 5/2003 | Malladi et al. ............... | 370/345 |
| 2004/0066772 | A1 * | 4/2004 | Moon et al. .................. | 370/342 |
| 2006/0221809 | A1 * | 10/2006 | Malladi et al. ............... | 370/206 |

FOREIGN PATENT DOCUMENTS

| | | |
|---|---|---|
| EP | 1 206 047 | 5/2002 |
| EP | 1 351 411 | 10/2003 |
| JP | 11-145901 | 5/1999 |

OTHER PUBLICATIONS

European Search Report dated Mar. 21, 2006.
Ari Hottinen et al. Multi-Antenna Transceiver Techniques for 3G and Beyond. 2003.
$3^{rd}$ Generation Partnership Project; Technical Specification Group Radio Access Network; Physical Channels and mapping of transport channels onto physical channels (FDD) Release 5.

(Continued)

*Primary Examiner* — Olumide T Ajibade Akonai
*Assistant Examiner* — Jaime Holliday
(74) *Attorney, Agent, or Firm* — Katten Muchin Rosenman LLP (57) ABSTRACT

A mobile wireless communication system including a wireless communication apparatus and a counterpart wireless communication apparatus is provided, the system establishing wireless communication between the wireless communication apparatus and the counterpart wireless communication apparatus by multiplexing plural channels including at least a traffic channel for transmitting a packet, a control channel for transmitting control information for receiving the packet, and a channel for transmitting information including transmission power control information. The wireless communication apparatus includes a transmission unit that transmits the transmission control information to the counterpart wireless communication apparatus via the channel for transmitting information including transmission power control information at intervals of a prescribed period that is longer than a length of the packet, and transmits the transmission power control information via the control channel when the packet is being transmitted via the traffic channel.

19 Claims, 6 Drawing Sheets

OTHER PUBLICATIONS

3$^{rd}$ Generation Partnership Project; Technical Specification Group Radio Access Network; Multiplexing and Channel Coding (FDD) Release 5.

3rd Generation Partnership Project; Technical Specification Group Radio Access Network; Spreading and modulation (FDD) (Release 5).

3rd Generation Partnership Project; Technical Specification Group Radio Access Network; Physical Layer procedures (FDD) (Release 5).

TSG-RAN Working Group I meeting #34 031073 Fractional Dedicated Physical Channel, Discussion on Multiplexing Options, Oct. 2003.

* cited by examiner

FIG.1

MOBILE WIRELESS COMMUNICATION SYSTEM AND WIRELESS COMMUNICATION APPARATUS USING TRANSMISSION POWER CONTROL INFORMATION

BACKGROUND OF THE INVENTION

1. Field of the Invention

The present invention relates to a mobile wireless communication system and a wireless communication apparatus that establishes wireless communication by controlling transmission power according to transmission power control information.

2. Description of the Related Art

Figure 1:
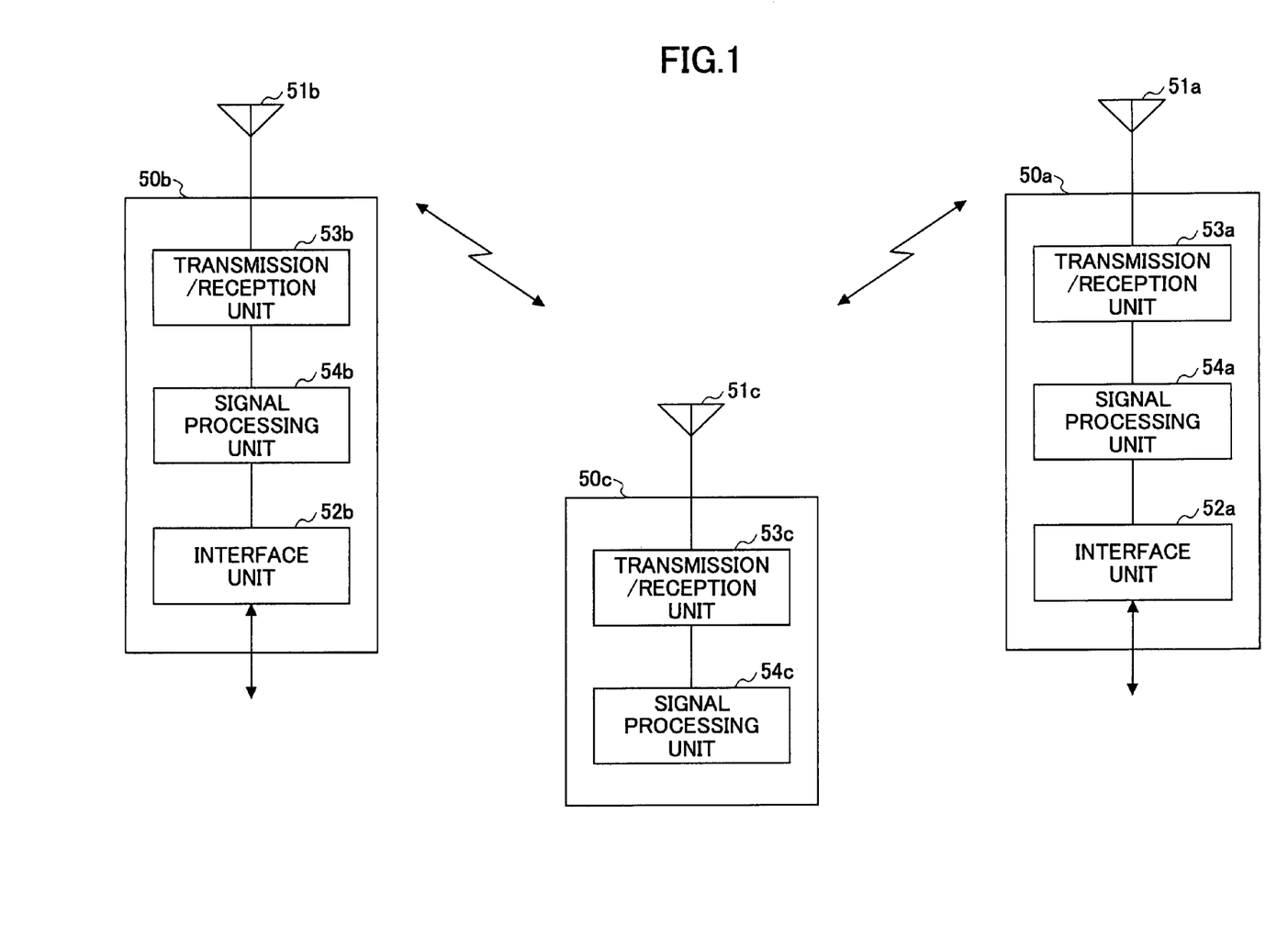
FIG. 1 is a diagram showing a configuration of a mobile wireless communication system.

A mobile wireless communication system that establishes wireless communication between wireless communication apparatuses such as a mobile station and a base station may have a configuration as is shown in FIG. 1. The mobile wireless communication system of FIG. 1 includes plural base stations 50a and 50b as wireless communication apparatuses that are located in different areas, and a mobile station 50c that conducts wireless communication while moving within the service areas of the base stations 50a and 50b. The base stations 50a and 50b and the mobile station 50c include antennas 51a, 51b, and 51c, transmission/reception units 53a, 53b, and 53c that include amplifiers, modulators, and demodulators, for example, and signal processing units 54a, 54b, and 54c, respectively. Also, the base stations 50a and 50b include interface units 52a and 52b, respectively, that form interfaces with a network (not shown).

The wireless communication scheme used in the wireless communication between the mobile station 50c and the base stations 50a and 50b may correspond to the W-CDMA (Wide-Code Division Multiple Access) scheme, the OFDM (Orthogonal Frequency Division Multiplexing) scheme, or other various schemes. Also, it is noted that transmission power control (TPC) information is transmitted from the base stations 50a and 50b to the mobile station 50c at predetermined intervals via downlink channels (dedicated channels) so that a signal transmitted from the mobile station 50c to the base stations 50a and 50b may be received with a suitable power that is sufficient for proper signal reception but is below a level that may cause interference with other channels. Based on the transmission power control information, the mobile station 50c conducts transmission power control to increase/decrease the transmission power of the transmission/reception unit 53c. The transmission power control information is generated according to the reception level (quality) of a signal such as a pilot signal that is transmitted from the mobile station 50c. For example, when the reception level (quality) is high, control information directing a decrease of the transmission power may be generated, and when the reception level (quality) is low, control information directing an increase of the transmission power may be generated.

In a mobile wireless communication system that realizes packet communication, an ACK signal is transmitted when a packet is properly received, and a NACK signal is transmitted when a packet cannot be properly received, the signals being transmitted via a dedicated channel. In such a system, even when packet transmission is rarely conducted, and transmission of reception response signals such as ACK and NACK signals is not necessary, a signal such as a pilot signal is continually transmitted via another dedicated channel for suitably adjusting the transmission power of the dedicated channel used for transmitting the reception response signals such as ACK and NACK signals. Thus, the mobile station unnecessarily consumes power for transmitting such signals.

In the W-CDMA scheme, HSDPA (High Speed Downlink Packet Access) for realizing a maximum downlink transmission speed of 14 Mbps is defined. According to this scheme, adaptive coding modulation is used for packet transmission. For example, QPSK (Quadrature Phase Shift Keying) modulation and 16-QAM (Quadrature Amplitude Modulation) may be adaptively interchanged to realize a transmission rate in accordance with the state of the wireless propagation path.

It is noted that HSDPA uses the H-ARQ (Hybrid Automatic Repeat Request) scheme. For example, in the mobile wireless communication system of FIG. 1, when the mobile station 50c receives packet data from the base station 50a and detects an error, the mobile station 50c sends a request to the base station 50a to retransmit the packet data. In turn, the base station 50a conducts retransmission of the packet data, and the mobile station 50c conducts an error correction decoding process using both the initially received data and the retransmitted data.

Also, it is noted that wireless channels such as HS-SCCH (High Speed-Shared Control Channel), HS-PDSCH (High Speed-Physical Downlink Shared Channel), and HS-DPCCH (High Speed-Dedicated Physical Control Channel) are used in HSDPA.

The wireless channels HS-SCCH and HS-PDSCH in a mobile wireless communication system correspond to downlink shared channels from the base station to the mobile station. The HS-SCCH corresponds to a control channel for transmitting parameter information pertaining to data transmitted by the HS-PDSCH. The parameter information may include modulation type information indicating the modulation method used in transmitting data via the HS-PDSCH, the diffusion code number, and pattern information for a rate matching process that is conducted on transmission data, for example.

The HS-DPCCH in the mobile wireless communication system corresponds to an uplink dedicated control channel from the mobile station to the base station, and is used upon transmitting from the mobile station to the base station an ACK signal or a NACK signal indicating whether data received via the HS-PDSCH are properly received. For example, in a case where CRC error is detected in the received data, a NACK signal is transmitted to the base station, and the base station conducts retransmission of the data in response to the NACK signal. Also, the HS-DPCCH is used to measure the reception quality (e.g., SIR: Signal to Interference Ratio) of a signal received from the base station, and periodically transmit the measurement result to the base station as a CQI (Channel Quality Indicator). The base station determines the state of the downlink wireless environment based on the CQI, and when it is determined that the wireless environment is in a good state, the base station switches to a modulation method that enables data transmission at a higher speed. On the other hand, when it is determined that the wireless environment is not in a good state, the base station switches to a modulation method that realizes data transmission at a lower speed.

Figure 2:
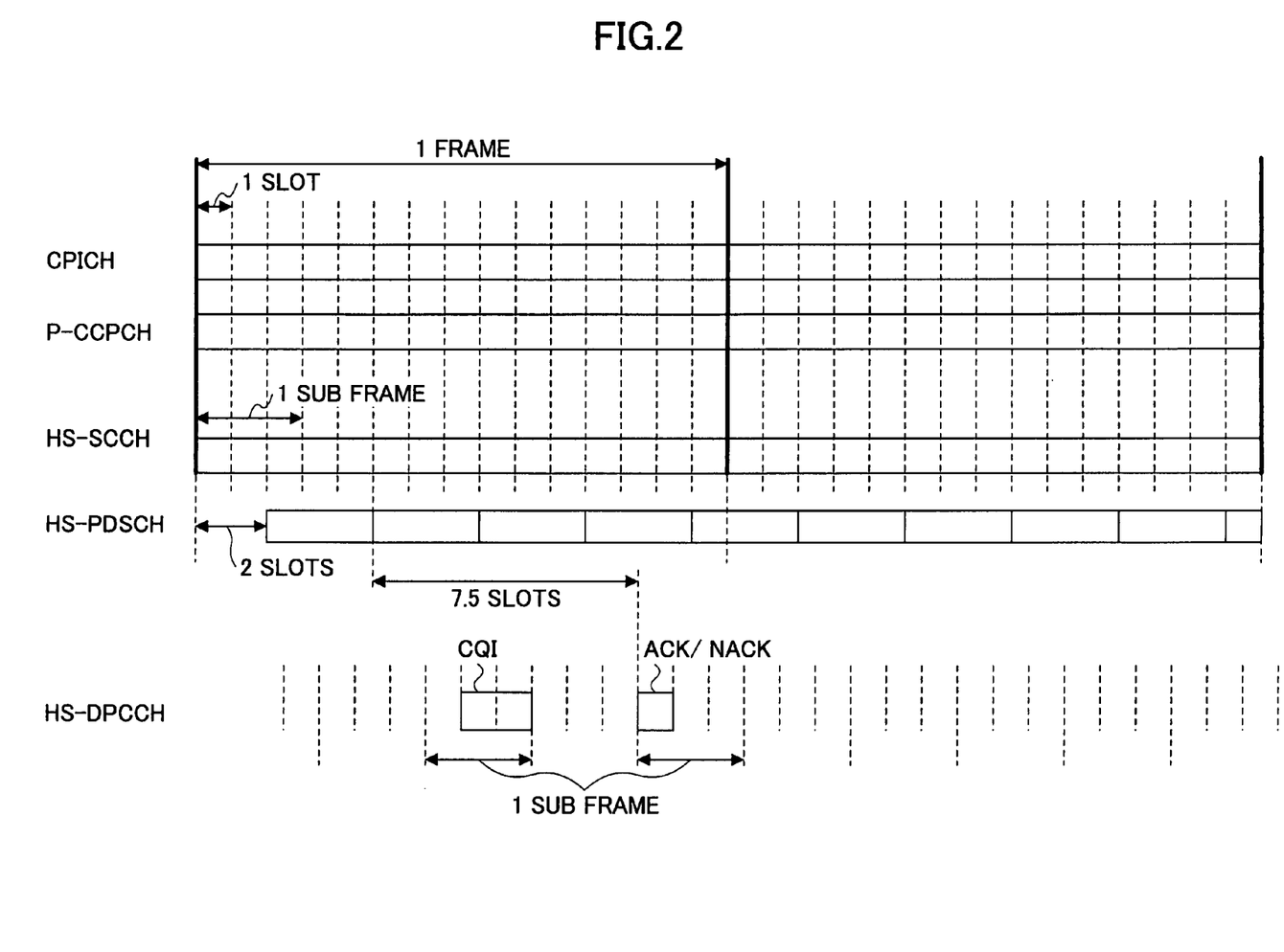
FIG. 2 is a diagram showing channels used in HSDPA.

FIG. 2 is a diagram showing the channels used in HSDPA. In this drawing, the wireless channels CPICH, P-CCPCH, HS-SCCH, HS-PDSCH, HS-DPCCH are shown. It is noted that the CPICH (Common Pilot Channel) and the P-CCPCH (Primary Common Control Physical Channel) correspond to downlink shared channels. The CPICH corresponds to a channel used for channel estimation and cell search at the mobile station, and as a timing reference of other downlink physical channels within the same cell; that is, the CPICH corresponds to a channel for transmitting the so-called pilot signal. The P-CCPCH corresponds to a channel for transmitting report information. The channels HS-SCCH, HS-PD- SCH, and HS-DPCCH correspond to control channels as described above, and the HS-DPCCH is used to transmit the CQI and ACK/NACK signals.

In the illustrated example of FIG. 2, 15 slots make up one frame (10 ms), and since the CPICH is used as a timing reference, the beginning (head) of the frames of the channels P-CCPCH and HS-SCCH correspond to the beginning (head) of the frame of CPICH; however, the beginning (head) of the frame of the HS-PDSCH is delayed by two slots. Such a delay is made so that the mobile station may receive and identify information pertaining to demodulation of the HS-PDSCH beforehand. That is, information pertaining to the modulation method and diffusion code is provided beforehand via the HS-SCCH so that demodulation and decoding of the HS-PDSCH may be suitably realized. Also, it is noted that in the channels HS-SCCH and HS-PSDCH, three slots make up one sub frame.

According to 3GPP TS 25.212 v.5.7.0 (3rd Generation Partnership Project; Technical Specification Group Radio Access Network; Multiplexing and Channel Coding (FDD)), the HS-SCCH represents the following information items:

(a) Xccs (Channelization Code Set Information); 7 bits; information on the diffusion code used for the HS-PDSCH;

(b) Xms (Modulation Scheme Information); 1 bit; modulation method used for the HS-PDSCH;

(c) Xtbs (Transport-Block Size Information); 6 bits; transmission data block size for error correction coding;

(d) Xhap (Hybrid-ARQ Process Information); 3 bits; process number for conducting retransmission control;

(e) Xrv (Redundancy and Constellation Version); 3 bits; parameter for rate matching;

(f) Xnd (New Data Indicator); 1 bit; information indicating whether data corresponds to new data; and (g) Xue (UE Identity); 16 bits; user identification information.

As can be appreciated from the above descriptions, the HS-SCCH is made up of 37 bits, and by receiving the HS-SCCH, parameter information pertaining to the modulation method, the diffusion code, and error correction, for example, may be identified. In turn, demodulation and decoding of the HS-DSCH may be conducted according to the parameter information.

The information (a) Xccs represents information on the diffusion code used in transmitting data via the HS-PDSCH. For example, Xccs may represent a combination of the multi-code number and code offset. The information (b) Xms indicates the modulation method being used, and for example, Xms may correspond to '1' or '0' depending on whether the current modulation method corresponds to QPSK modulation or 16-QAM. The information (c) Xtbs corresponds to data for calculating the data size for transmitting a sub frame of the HS-PDSCH. The information (d) Xhap represents a process number for H-ARQ, and corresponds to a consecutive number with respect to that of a previously transmitted data block. It is noted that in the case of a retransmission process, the same process number assigned to the previously transmitted data block is used.

The information (e) Xrv represents redundancy parameter or constellation parameter information in the retransmission of the HS-PDSCH. It is noted that in some cases, the parameter information may be updated upon transmission or retransmission, and in other cases, the parameter information may be left as it is. The information (f) Xnd corresponds to data indicating whether the transmitted block corresponds to a new data block or a retransmitted data block. For example, in the case of a new block, '1' and '0' may be interchanged, and in the case of a retransmitted block, the arrangement of '1' and '0' may be left unchanged. The information (g) Xue corresponds to identification information of the mobile station (user).

By receiving the HS-SCCH, parameter information pertaining to the modulation method, the diffusion code, and error correction used at the HS-PDSCH may be identified, and demodulation and decoding of the HS-PDSCH may be conducted (e.g., see "Multi-Antenna Transceiver Techniques for 3G and Beyond" by Ari Hottinen, Olav Tirkkonen, and Risto Wichman; 3GPP TS 25.211, Physical Channels and Mapping of Transport Channels onto Physical Channels (FDD), v. 5.5.0; 3GPP TS 25.213, Spreading and Modulation (FDD), v. 5.5.0; and 3GPP TS 25.214, Physical Layer Procedures (FDD), v. 5.7.0).

Also, to enhance the W-CDMA system, use of the F-DPCH (Fractional Dedicated Physical Channel) is proposed (e.g. see 3GPP R1-031073). According to this technique, the same diffusion code is assigned to the pilot signals and transmission power control (TPC) information of a dedicated channel for plural users, and transmission is conducted through time division multiplexing within the same slot.

Generally, a mobile station (user) that receives data via a shared channel (traffic channel) such as the HS-PDSCH transmits traffic data via the HS-PDSCH, and thereby, data to be transmitted via the dedicated channel (e.g., DPCH as opposed to an HS channel) are virtually non-existent at such a mobile station. Nonetheless, TPC bits and pilot signals have to be transmitted in order to conduct transmission power control, and thereby, the dedicated channel (DPCH) and the HS-PDSCH have to be connected at the same time. In this case, a code is occupied even when data transmission does not have to be conducted, and when plural mobile stations (users) in similar situations exist, a deficiency in code resources may be created. In response to such a problem, the technique implementing the F-DPCH involves using the same code to conduct a diffusion process and time division multiplexing with respect to TPC bits and pilot signals of plural users that have no transmission data to be transmitted through a dedicated channel.

Also, as another measure for countering a deficit of code resources, Japanese Laid-Open Patent Publication No. 11-145901 discloses a wireless communication apparatus that conducts transmission power control through providing a dedicated power control channel, embedding TPC bits of plural users into the transmission power control channel through time division multiplexing, and embedding identical TPC bits into traffic channels for conducting packet transmission, wherein when a packet to be transmitted is generated, the TPC bits of the power control channel is converted into invalid information so that the TPC bits of the traffic channel is prioritized.

In the W-CDMA scheme, transmission power control (TPC) of a dedicated channel (DPCH) is conducted via an uplink channel. The transmission power control (TPC) involves controlling the transmission power of the mobile station by feeding back transmission control information referred to as TPC bits in slot units from the base station to the mobile station. On the other hand, in a packet communication scheme using shared channels such as the HS-PDSCH, pilot signals and TPC bits are periodically transmitted via uplink and downlink DPCH channels so that transmission power for transmitting a reception response signal is adjusted to a suitable level at a mobile station even when data are not addressed to the mobile station. In such a case, code resources have to be used for transmission power control of the respective dedicated channels, and thereby, a deficiency in code resources is created. Also, since the mobile station has to transmit pilot signals on a constant basis, a large amount of power is consumed as a result.

Also, a technique is proposed in the prior art that uses the F-DPCH in the W-CDMA scheme to integrate plural A-DPCH channels through time division multiplexing for realizing efficient use of code resources. However, since transmission power control (TPC) bits are transmitted in slot units, multiplexing may not be conducted for a large number of users. That is, according to this technique, a large number of mobile stations conducting packet transmission cannot be accommodated within the same area. Also, according to this technique, it is assumed that a signal is transmitted on a constant basis via the uplink channel. That is, the mobile station is arranged to transmit a signal such as a pilot signal for realizing transmission power control regardless of whether packet transmission is conducted. This arrangement is disadvantageous from the point of view of power conservation. It is noted that the mobile station uses a relatively small battery as a power source to conduct transmission/reception processes, and thereby, it is desired that power consumption be reduced in order to realize packet transmission for a long period of time.

Also, in the prior art technique involving the use of a power control channel and a traffic channel for transmitting TPC bits, when the TPC bits are transmitted via the traffic channel, the TPC bits at the power control channel have to be invalidated in order to prevent generation of a conflict. Such processes may be quite complicated thereby leading to high power consumption. Also, since the power control channel is arranged to be transmitted when a transmission control packet does not exist and is therefore not transmitted on a periodic basis, power control may not be stabilized.

SUMMARY OF THE INVENTION

The present invention has been conceived in response to one or more of the problems of the related art, and its object is to enable transmission power control with low power consumption and high accuracy.

According to an aspect of the present invention, a mobile wireless communication system is provided that includes:

a wireless communication apparatus and a counterpart wireless communication apparatus; wherein wireless communication is established between the wireless communication apparatus and the counterpart wireless communication apparatus by multiplexing a plurality of channels including at least a traffic channel for transmitting a packet, a control channel for transmitting control information for receiving the packet, and a channel for transmitting information including transmission power control information; and the wireless communication apparatus includes a transmission unit that transmits the transmission control information to the counterpart wireless communication apparatus via the channel for transmitting information including transmission power control information at intervals of a prescribed period that is longer than a length of the packet, and transmits the transmission power control information via the control channel when the packet is being transmitted via the traffic channel.

In a preferred embodiment of the present invention, the counterpart wireless communication apparatus includes a transmission unit that transmits a pilot signal right before receiving the transmission power control information transmitted from the wireless communication apparatus via the channel for transmitting information including transmission power control information and right after receiving the transmission power control information transmitted from the wireless communication apparatus via the control channel.

In another preferred embodiment of the present invention, the transmission power control information transmitted from the wireless communication apparatus to the counterpart wireless communication apparatus includes first transmission power control information that is transmitted via the channel for transmitting information including transmission power control information and second transmission power control information that is transmitted via the control channel, and the transmission unit of the counterpart wireless communication apparatus transmits the pilot signal at periodic intervals shorter than a transmission period at which the first transmission power control information is transmitted.

In another preferred embodiment of the present invention, the transmission power control information transmitted from the wireless communication apparatus to the counterpart wireless communication apparatus includes first transmission power control information that is transmitted via the channel for transmitting information including transmission power control information and second transmission power control information that is transmitted via the control channel, and a transmission power control level represented by the second transmission power control information is arranged to be greater than or equal to a transmission power control level represented by the first transmission power control information.

According to another aspect of the present invention, a wireless communication apparatus is provided that is configured to transmit data within a mobile wireless communication system that realizes data transmission via a shared channel, the apparatus including:

a transmission unit that is configured to transmit to a mobile station first transmission power control information at intervals of a prescribed period, and transmit control information for receiving the data including second transmission power control information when transmitting the data to the mobile station.

In a preferred embodiment of the present invention, a transmission power control level represented by the second transmission power control information that is included in the control information is arranged to be greater than or equal to a transmission power control level represented by the first transmission power control information that is transmitted at intervals of the prescribed period.

According to another aspect of the present invention, a wireless communication apparatus is provided that is configured to receive data within a mobile wireless communication system that realizes data transmission via a shared channel, the apparatus including:

a transmission unit that is configured to transmit a pilot signal in conjunction with receiving control information for receiving the data.

In a preferred embodiment of the present invention, the transmission unit is further configured to transmit the pilot signal at intervals of a prescribed period, and the transmission of the pilot signal in conjunction with the reception of the control information is conducted at periodic intervals shorter than the prescribed period.

According to an aspect of the present invention, transmission power control information is transmitted at prescribed periodic intervals via a channel for transmitting information including the transmission power control information, and when packet transmission is conducted, transmission power control information is also transmitted via a control channel. When packet transmission is not conducted, the transmission power control information is transmitted via the channel for transmitting information including transmission power control information at prescribed periodic intervals that are set to be relatively long, thereby enabling conservation of power. According to an embodiment of the present invention, a pilot signal is transmitted at prescribed periodic intervals rather than being continuously transmitted, and the packet signal is also transmitted upon indicating the presence of a packet for transmission to thereby enable further power conservation. According to an embodiment of the present invention, the transmission power control information includes first transmission power control information that is transmitted via the channel for transmitting information including transmission power control information and second transmission power control information that is transmitted via the control channel, and a transmission power control level represented by the second transmission power control information is arranged to be greater than that represented by the first transmission power control information to improve responsiveness of the transmission power control operation.

According to another aspect of the present invention, by transmitting the transmission power control information at prescribed periodic intervals, the transmission power control information may be included in the control information for receiving data while maintaining stability in the transmission power control operation, and the transmission power control information may be transmitted in conjunction with data transmission.

DESCRIPTION OF THE PREFERRED EMBODIMENTS

In the following, preferred embodiments of the present invention are described with reference to the accompanying drawings.

A mobile wireless communication system according to an embodiment of the present invention includes a wireless communication apparatus such as a base station and a counterpart wireless communication apparatus such as a mobile station, and is arranged to establish wireless communication between the wireless communication apparatus and the counterpart wireless communication apparatus by multiplexing a plurality of channels including at least a traffic channel for transmitting a packet, a control channel for transmitting control information for receiving the packet, and a channel for transmitting information including transmission power control information. In such a system, the wireless communication apparatus corresponding to a base station, for example, is arranged to include a transmission unit that transmits the transmission control information to the counterpart wireless communication apparatus corresponding to the mobile station, for example, via the channel for transmitting information including transmission power control information at intervals of a prescribed period that is longer than the length of the packet, and transmits the transmission power control information via the control channel when the packet is being transmitted via the traffic channel.

A wireless communication apparatus according to an embodiment of the present invention corresponds to a wireless communication apparatus such as a base station of a mobile wireless communication system, and includes a transmission unit that is configured to transmit to a mobile station via a dedicated channel first transmission power control information at intervals of a prescribed period that is longer than a length of a packet transmitted by a traffic channel, and transmit second transmission power control information via a control channel when transmitting the packet via the traffic channel.

It is noted that the transmission power control information in the following descriptions is assumed to be valid information (to be used at the reception side).

Figure 3:
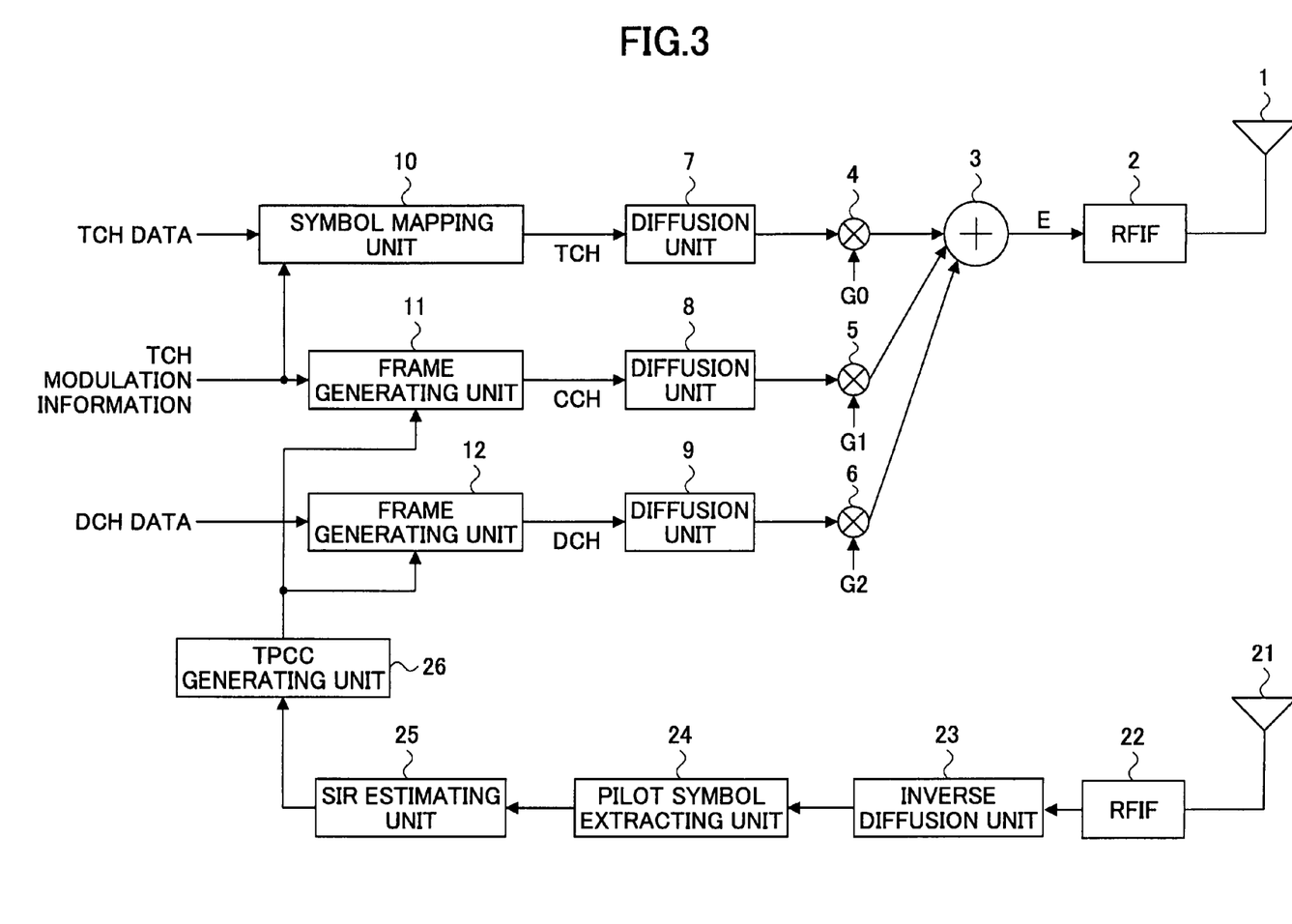
FIG. 3 is a diagram showing a configuration of a wireless communication apparatus according to an embodiment of the present invention.

FIG. 3 is a diagram showing an exemplary configuration of a wireless communication apparatus according to an embodiment of the present invention. The wireless communication apparatus of FIG. 3 may correspond to a wireless communication apparatus such as a base station of a mobile wireless communication system implementing the CDMA scheme that includes at least a wireless communication apparatus and a counterpart wireless communication apparatus. According to the present example, the wireless communication apparatus includes antennas 1 and 21, a high frequency processing unit (RFIF) 2, a multiplexing unit 3, multiplying units 4, 5, and 6, diffusion units 7, 8, and 9, a symbol mapping unit 10, frame generating units 11 and 12, a high frequency processing unit (RFIF) 22, an inverse diffusion unit 23, a pilot symbol extracting unit 24, a SIR (Signal to Interference Ratio) estimating unit 25, and a TPCC (transmission power control information) generating unit 26. It is noted that known configurations may be implemented to realize the interface with the network (in a case where the apparatus corresponds to a base station) and generation processing units for generating TCH data, TCH modulation information, and DCH data, and thereby, such components are omitted from the present drawing.

According to the present embodiment, the high frequency processing unit 2 that is connected to the antenna 1 includes an encoder, a modulator, and an amplifier, for example. The high frequency processing unit 22 that is connected to the antenna 21 includes a low noise amplifier, a demodulator, and a decoder, for example. Also, TCH (traffic channel such as HS-PDSCH) data are input to the symbol mapping unit 10, TCH modulation information (e.g., information to be transmitted via the HS-SCCH) is input to the symbol mapping unit 10 and the frame generating unit 11, and DCH (dedicated channel such as DPCH) data are input to the frame generating unit 12. At the symbol mapping unit 10, the TCH data are mapped according to the TCH modulation information, and input to the diffusion unit 7 as traffic channel TCH. At the diffusion unit 7, a diffusion process is conducted on the TCH using a diffusion code assigned to the TCH, and the diffused signal is input to the multiplying unit 4.

The frame generating unit 11 generates a frame including the TCH modulation information and transmission power control information from the TPCC generating unit 26, and inputs the generated frame to the diffusion unit 8 as a control channel CCH. At the diffusion unit 8, a diffusion process is conducted using a diffusion code assigned to the control channel CCH, and the diffused signal is input to the multiplying unit 5. The frame generating unit 12 generates a frame including the DCH data and the transmission power control information from the TPCC generating unit 26, and inputs the generated frame to the diffusion unit 9 as a dedicated channel DCH. At the diffusion unit 9, a diffusion process is conducted using a diffusion code assigned to the dedicated channel, and the diffused signal is input to the multiplying unit 6. As can be appreciated from the above descriptions, in the present embodiment, the TCH data, the TCH modulation information, and the DCH data are diffused by differing diffusion codes. Also, the multiplying units 4, 5, and 6 multiply their inputs by gains G0, G1, and G2, respectively, to set the transmission power ratios of the respective channels, and at the multiplexing unit 3, multiplexing is realized by conducting adding processes on chips. The multiplexed signal is then input to the high frequency processing unit 2 at which modulation and amplification processes are conducted, and the resulting signal is transmitted via the antenna 1. It is noted that in this example, the diffusion codes used in the diffusion units 7, 8, and 9 are arranged to differ from each other.

The high frequency processing unit 22 conducts processes such as amplification, demodulation, and decoding on a signal received by the antenna 21. The inverse diffusion unit 23 receives the signal processed by the high frequency processing unit 22 and conducts an inverse diffusion process on the signal. Then, the pilot symbol extracting unit 24 receives the inverse-diffused signal and extracts a pilot symbol (e.g., upon receiving an uplink DPSCH). The SIR estimating unit 25 estimates a SIR (Signal to Interference Ratio) from plural pilot symbols, and inputs the estimated SIR value to the TPCC generating unit 26. The TPCC generating unit 26 compares the input SIR value with a threshold value, and sets the TPCC according to the comparison result. For example, when the SIR value is greater than the threshold value, the TPCC may be set to TPCC=−1, and when the SIR value is less than the threshold value, the TPCC may be set to TPCC=+1. The TPCC is then input to the frame generating units 11 and 12 as transmission power control information. As is described below, the TPCC may also be arranged to conduct transmission power control in plural stages.

According to the present embodiment, the TCH modulation information and the transmission power control information TPCC are transmitted from the frame generating unit 11 by a control channel CCH (e.g., HS-SCCH), and the DCH data and the transmission power control information TPCC are transmitted from the frame generating unit 12 by a dedicated channel DCH (e.g., DPCH). That is, the transmission power control information is transmitted by both the control channel CCH and the dedicated channel DCH. In a case where the transmission power control information TPCC is transmitted by the dedicated channel DCH at relatively long periodic intervals and packet transmission is conducted based on a signal from the control channel CCH indicating whether a packet is present, the transmission power control information TPCC is transmitted by the control channel CCH in accordance with the packet transmission timing. It is noted that the transmission of the transmission power control information as is described above may be controlled by a control unit (not shown). The transmission of the transmission power control information TPCC according to the packet transmission timing is conducted at shorter periodic intervals compared to that for the transmission of the transmission power control information TPCC by the dedicated channel DCH. Thereby, the responsiveness of the transmission power control operation may be improved. It is noted that in one embodiment, the power control level represented by the transmission power control information transmitted by the control channel CCH may be arranged to be greater than the power control level represented by the transmission power control information transmitted by the dedicated channel DCH.

Figure 4:
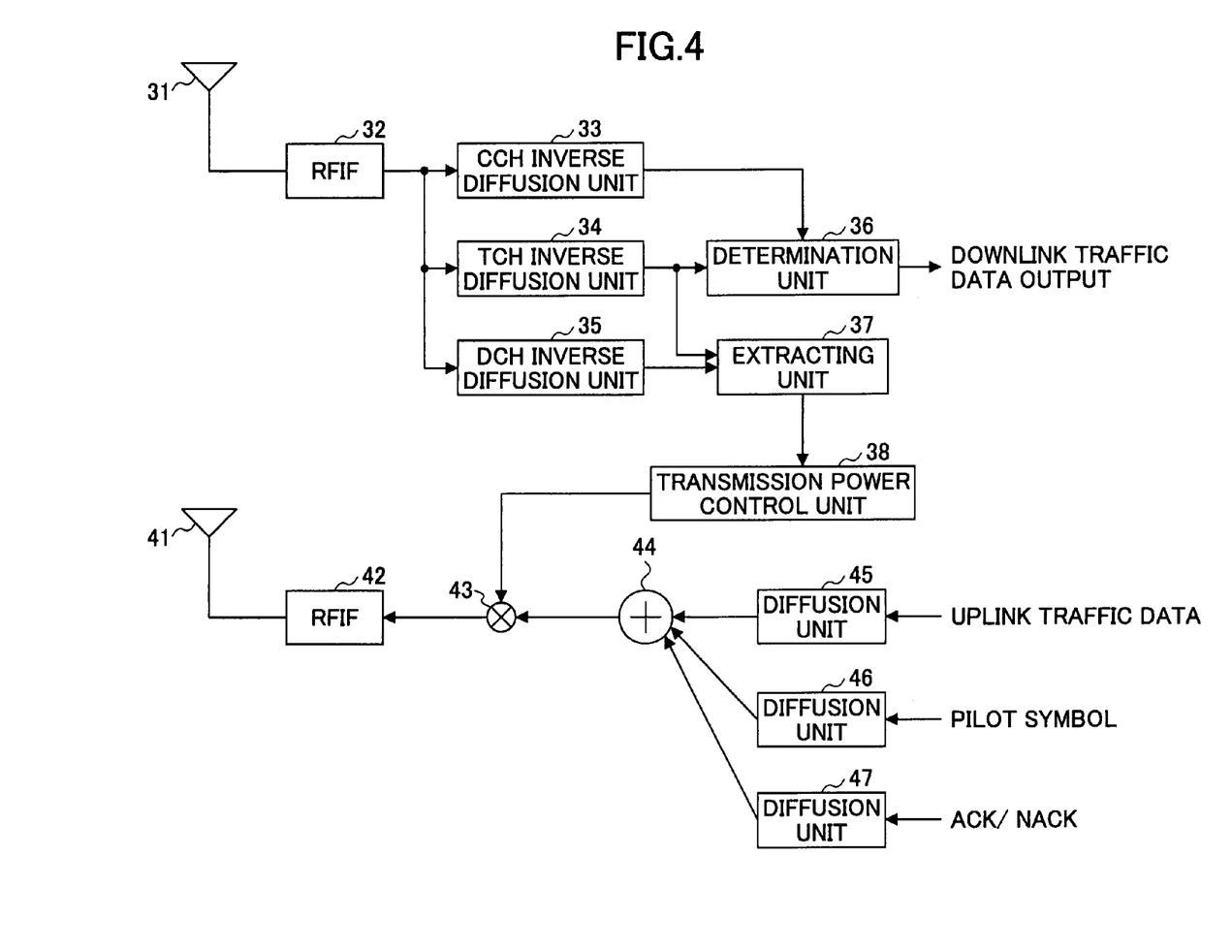
FIG. 4 is a diagram showing a configuration of a counterpart wireless communication apparatus according to an embodiment of the present invention.

FIG. 4 is a diagram showing an exemplary configuration of a counterpart wireless communication apparatus according to an embodiment of the present invention. The counterpart wireless communication apparatus of FIG. 4 may correspond to a mobile station of the mobile wireless communication system using the CDMA scheme that includes a wireless communication apparatus and a counterpart wireless communication apparatus. The counterpart wireless communication apparatus of FIG. 4 includes antennas 31 and 42, a high frequency processing unit (RFIF) 32, a CCH inverse diffusion unit 33, a TCH inverse diffusion unit 34, a DCH inverse diffusion unit 35, a bit determination unit 36, a TPCC extracting unit 37, a transmission power control unit 38, a high frequency processing unit (RFIF) 42, a multiplying unit 43, a multiplexing unit 44, and diffusion units 45, 46, and 47. It is noted that known configurations may be implemented to realize processing units for processing down link traffic data and uplink traffic data, and thereby, such components are omitted from the present drawing.

The antenna 31 receives a signal transmitted from the antenna 1 of FIG. 3, for example, and inputs the received signal to the high frequency processing unit 32. The high frequency processing unit 32 includes a low noise amplifier, a demodulator and a decoder, for example. The antenna 41 is configured to transmit a signal from the high frequency processing unit 42 to the antenna 21 of FIG. 3, for example. The high frequency processing unit 42 includes an encoder, a modulator, and a transmission power amplifier, for example. The high frequency processing unit 32 demodulates and decodes a received signal and inputs the processed signal to the CCH inverse diffusion unit 33, the TCH inverse diffusion unit 34, and the DCH inverse diffusion unit 35. In turn, the CCH inverse diffusion unit 33, the TCH inverse diffusion unit 34, and the DCH inverse diffusion unit 35 conduct inverse diffusion processes on the input signal using the respective diffusion codes used in the corresponding diffusion processes conducted at the transmission side.

The CCH inverse diffusion unit 33 conducts an inverse diffusion process on the CCH information that is transmitted from the transmission side, and inputs the inverse-diffused information to the bit determination unit 36. The TCH inverse diffusion unit 34 conducts an inverse diffusion process on the TCH modulation information that is transmitted from the transmission side, and inputs the inverse-diffused information to the bit determination unit 36. In turn, the bit determination unit outputs downlink traffic data. Also, inverse diffusion outputs including transmission power control information that are obtained by inverse diffusion processes conducted by the TCH inverse diffusion unit 34 and the DCH inverse diffusion unit 35, respectively, are input to the TPCC extracting unit 37 at which the transmission power control information is extracted. The extracted transmission power information is then input to the transmission power control unit 38.

Also, according to the present embodiment, uplink traffic data, a pilot symbol, and a ACK/NACK signal based on the reception processing result of processing downlink traffic data output are input to the diffusion units 45, 46, and 47, respectively, to be diffused by differing diffusion codes. Then the diffused signals are multiplexed at the multiplexing unit 44, and multiplied at the multiplying unit 43 by a control value from the transmission power control unit 38 to realize transmission power control. Then, processes such as coding, modulation and amplification are conducted by the high frequency processing unit 42, after which the processed signal is transmitted via the antenna 41. According to an embodiment, the transmission power control unit 38 is configured to increment the transmission power Ptx by +1 dB when the transmission power control information TPCC extracted by the TPCC extracting unit 37 is greater than 0 (TPCC>0), and the transmission power control unit 38 is configured to decrement the transmission power Ptx by −1 dB when the transmission power control information is TPCC is less than 0 (TPCC<0). In this way, the transmission power control unit 38 is arranged to input a value to the multiplying unit 43 according to the updated transmission power Ptx. It is noted that the transmission power control information TPCC may be arranged to use plural bits so that transmission power control may be conducted in plural stages (i.e., so that transmission power may be increased or decreased in plural stages).

Figure 5:
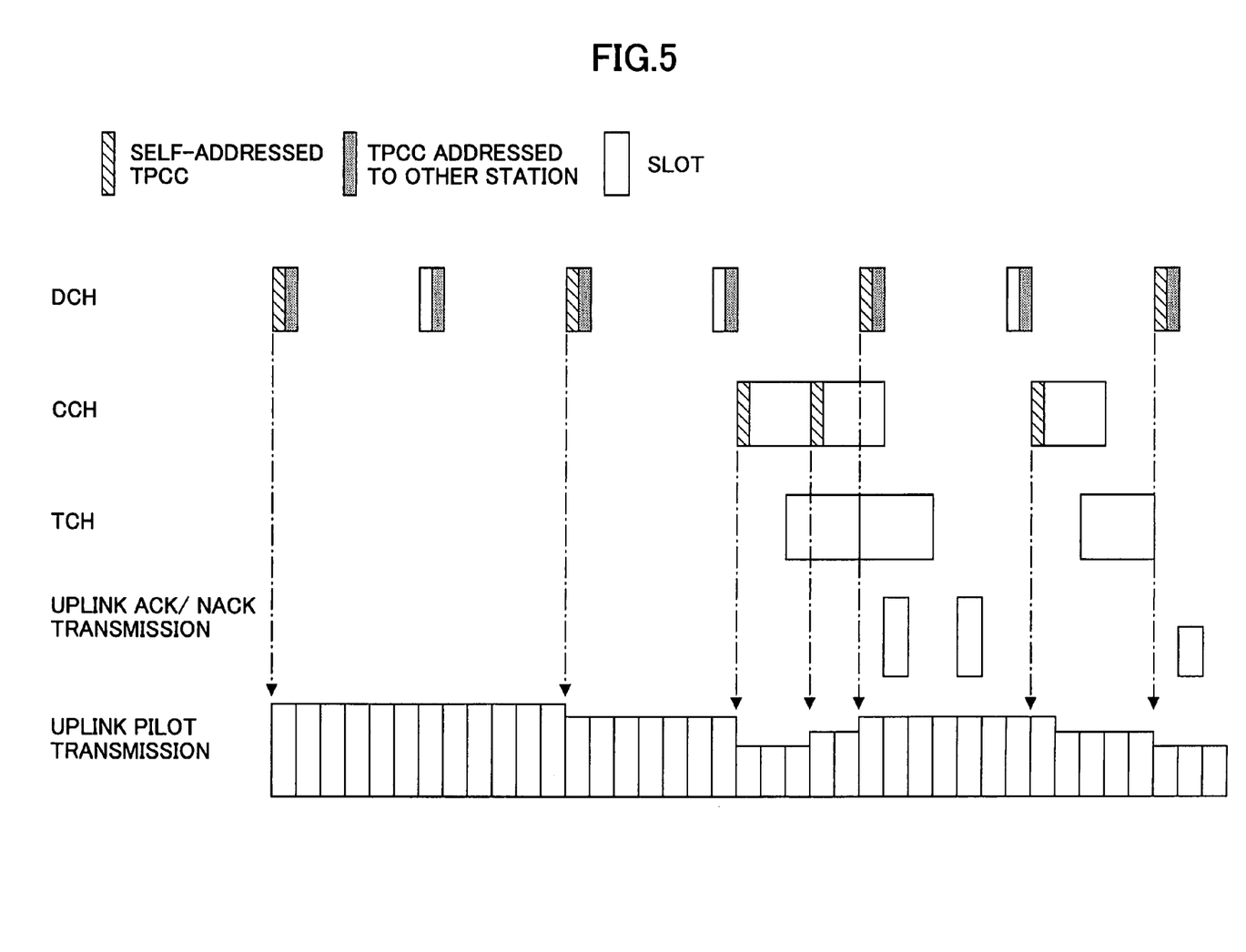
FIG. 5 is a diagram illustrating a transmission power control operation according to a first embodiment of the present invention.

FIG. 5 is a diagram illustrating a transmission power control operation according to a first embodiment of the present invention. In this drawing, a dedicated channel DCH, a control channel CCH, a traffic channel TCH, an uplink ACK/NACK signal transmission, and an uplink pilot signal transmission are shown. In the present embodiment, the uplink pilot signal is successively transmitted irrespective of the uplink ACK/NACK transmission. It is noted that in the present drawing, the transmission power levels are represented by the relative heights of the indicated signals. Given that transmission power control information TPCC transmitted by the dedicated channel DCH is referred to as first transmission power control information, and the transmission power control information TPCC transmitted by the control channel CCH is referred to as second transmission power control information, the first transmission power control information includes a slot that is made up of TPCC addressed to a present mobile station (self-addressed TPCC) and TPCC addressed to another mobile station, and a slot that does not include a self-addressed TPCC. In other words, first transmission power control information TPCC that is addressed to the present mobile station is transmitted at relatively long periodic intervals which transmission period may be set in advance at the transmission side. The self-addressed TPCC that is transmitted by the control channel CCH; namely, the second transmission power control information, is transmitted in accordance with the packet transmission period, which is arranged to be shorter than the transmission period of the first transmission power control information.

As can be appreciated from the above descriptions, when packet transmission is not conducted, the first transmission power control information is transmitted at relatively long periodic intervals, and accordingly, transmission power control is conducted at relatively long periodic intervals. When packet transmission is conducted, the second transmission power control information is transmitted according to the packet transmission period, and thereby, transmission power control may be conducted at a faster pace. Thus, when packet transmission is not conducted, unnecessary transmission power control processes are omitted so that the power consumption rate may be reduced. On the other hand, when packet transmission is conducted, the first transmission power control information and the second transmission power control information are transmitted so that high-pace transmission power control may be conducted with regard to state changes such as fading occurring in the wireless propagation path.

Figure 6:
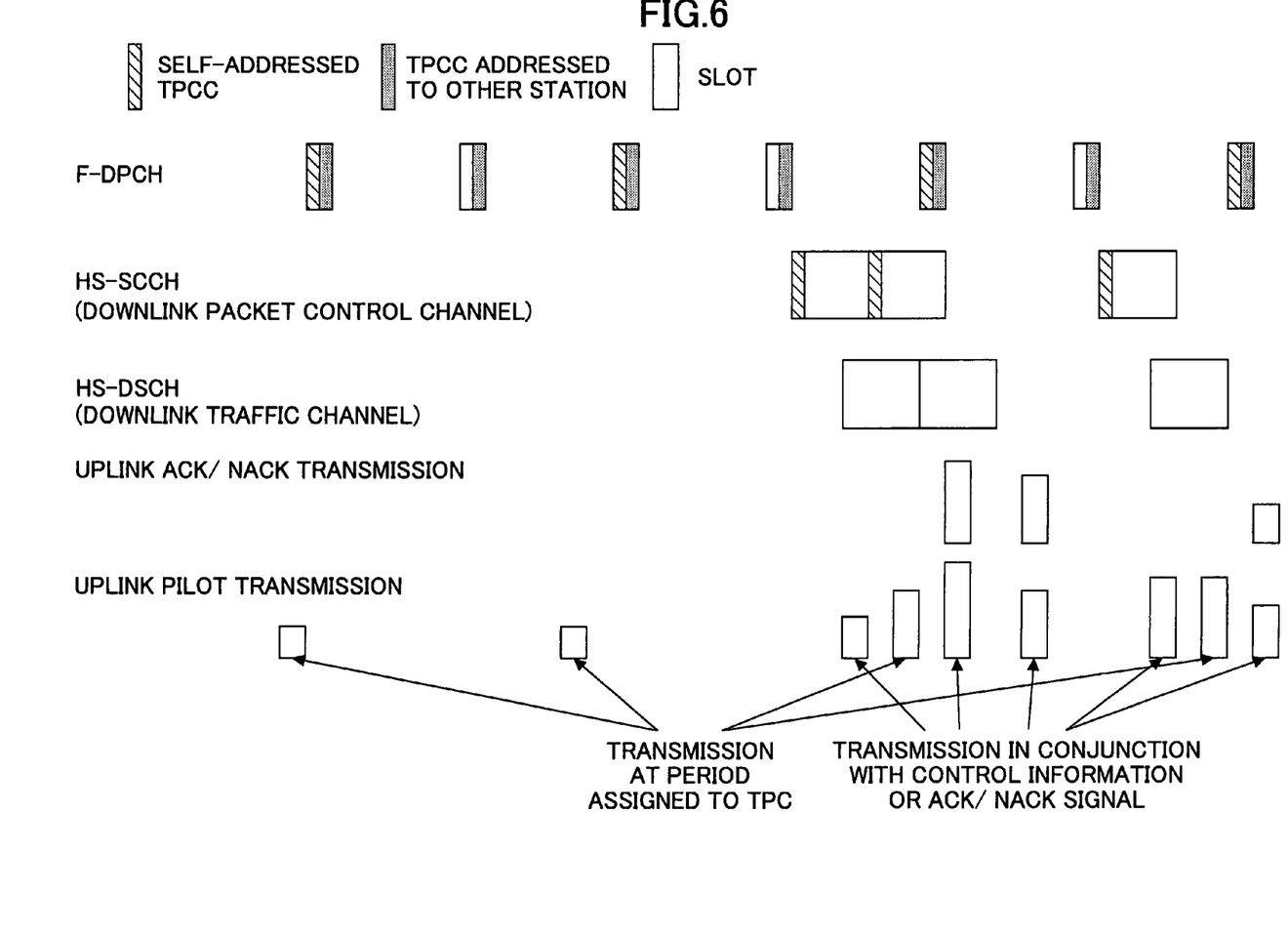
FIG. 6 is a diagram illustrating a transmission power control operation according to a second embodiment of the present invention.

FIG. 6 is a diagram illustrating a transmission power control process according to a second embodiment of the present invention. According to the present embodiment, F-DPCH (Fractional Dedicated Physical Channel) is used. The F-DPCH is made up of slots including at least a TPC bit and a pilot signal. In this drawing, a HS-SCCH (Shared Control Physical Channel) (downlink packet control channel), a HS-PDSCH (High Speed Downlink Shared Channel) (downlink traffic channel), an uplink ACK/NACK transmission (the transmission channel corresponding to a HS-DPCCH), and an uplink pilot transmission (the transmission channel corresponding to a DPCH are shown.

The TPC bit (transmission power control information) is transmitted via the F-DPCH and HS-SCCH.

The F-DPCH corresponds to a channel that is capable of transmitting a slot including plural TPC bits addressed to differing mobile stations. In the illustrated example, TPC bits addressed to two mobile stations are temporally multiplexed. It is noted that in this example, the transmission period of the TPC bits addressed to one mobile station (i.e., indicated as self-addressed TPC bits) is set to two slots. That is, the self-addressed TPC bit is not included in every other slot. Also, the transmission period of the TPCC addressed to another mobile station is also set to two slots in this example; however, it is noted that differing transmission periods may be set for the respective mobile stations.

The frames of the HS-SCCH are also configured to transmit TPC bits to mobile stations that are subject to control data transmission. It is noted that in the present drawing, HS-SCCH transmission to one mobile station is illustrated.

The mobile station receiving the HS-SCCH receives the HS-PDSCH and packet data, and transmits the reception result as a response signal (e.g., ACK/NACK signal) via the HS-DPCCH. According to the present example, the HS-PDSCH is received three times, and the ACK/NACK signal is transmitted after the elapse of a predetermined time from the channel reception timing, taking into account factors such as reception processing delay.

The pilot signal is transmitted in conjunction with the transmission period of the first transmission power control information (self-addressed TPCC), and is transmitted before the transmission timing of the first transmission power control information. It is noted that such a transmission power control may be realized by a control unit (not shown) according to the timing of inputting the pilot symbol to the diffusion unit 46 of the wireless communication apparatus shown in FIG. 4, for example.

That is, a self-addressed TPCC is periodically transmitted, and in order to generate such transmission power control information, a known signal (pilot signal) is transmitted from the mobile station before the self-addressed TPCC is transmitted (i.e., prior to the TPCC transmission by a predetermined time period so as to be in time for the TPC bit generation).

The pilot signal is also transmitted in conjunction with the transmission of control information and ACK/NACK signals that are transmitted via the HS-SCCH.

That is, when a mobile station recognizes that data is being transmitted to itself via the HS-SCCH, or when it receives data addressed to itself via the HS-PDSCH, it transmits a known signal (pilot signal) upon transmitting an ACK signal or a NACK signal.

It is noted that the reception of the HS-PDSCH and the transmission of the ACK/NACK signal are conducted in conjunction with the reception of the HS-SCCH, and thereby, in either case, the known signal is transmitted in conjunction with the reception of the HS-SCCH.

According to the present embodiment, the wireless communication apparatus as is shown in FIG. 3 that may correspond to a base station receives a pilot signal, conducts SIR estimation on the pilot signal at the SIR estimating unit 25, generates transmission power control information TPCC at the TPCC generating unit 26, and transmits the transmission power control information TPCC via the F-DPCH as first transmission power control information TPCC at relatively long periodic intervals (transmission period of the present mobile station). Also, in a case where packet transmission is conducted, the transmission power control information is transmitted via the HS-SCCH as second transmission power control information TPCC at a shorter periodic cycle. In this embodiment, transmission power control may be realized without having to transmit the pilot signal on a continual basis, and thereby, the power consumption rate for transmitting the pilot signal may be reduced. Also, in a case where data are transmitted via the HS-PDSCH, transmission power control may be conducted through transmission of an ACK/NACK signal before the transmission period of the first transmission power control information TPCC based on the transmission power control information TPCC that is previously transmitted via the HS-SCCH. Thereby, transmission power may be suitably controlled to quickly respond to the transmission quality such as the SIR of the wireless propagation path.

In a preferred embodiment, a predetermined number of pilot signals of a predetermined length are transmitted at a transmission period that is shorter than the transmission period of the first transmission power control information TPCC. When packet data are transmitted, it is likely that more data to be transmitted remain, and thereby, according to the present embodiment, preparation may be made for the transmission of the next data transmission in accordance with the transmission schedule.

Also, it is noted that the pilot transmission other than that in conjunction with the HS-SCCH transmission may be arranged to be conducted at a transmission period that is shorter than the transmission period of the first transmission power control information TPCC via the F-DPCH. When pilot signals are received and processed to realize SIR estimation, the estimation accuracy may be improved by increasing the number of pilot signals although increasing the pilot signal transmission leads to an increase in the power consumption for transmitting the pilot signal. Accordingly, in one embodiment, the transmission period for the first transmission power control information may be arranged to be relatively long to reduce power consumption, and the transmission period for transmitting the pilot signal may be adjusted to a shorter period in order to avoid degradation of the estimation accuracy.

In another embodiment, the first transmission power control information TPCC1 transmitted via the F-DPCH, and the second transmission power control information TPCC2 transmitted via the HS-SCCH may be arranged to represent different transmission power control levels. In such a case, the second transmission power control information TPCC2 is arranged to be greater than the first transmission power control information TPCC1 (TPCC1<TPCC2). According to the present embodiment, in transmitting the ACK/NACK signal, for example, the second transmission power control information TPCC2 that is previously received via the HS-SCCH may be used to swiftly control the transmission power to a desired level.

It is noted that in the illustrated example of FIG. 6, the leftmost TPC bit in the HS-SCCH is generated based on the most recently received pilot signal before this TPC bit (i.e., the second pilot signal from the left in FIG. 6). When a mobile station receives the third (from the left) pilot signal, the mobile station may generate the second (from the left) TPC bit in the HS-SCCH based on the third pilot signal, and thereby, accurate transmission power control may be conducted upon transmitting the first ACK signal.

Also, in the illustrated example of FIG. 6, there is an interval between the second TPC bit and the third TPC bit in the HS-SCCH; however, since a predetermined number of the pilot signals at predetermined lengths are arranged to be transmitted in conjunction with the HS-SCCH transmission in the present embodiment, the TPC bit may be generated based on a pilot signal being transmitted at a shorter period compared to the transmission period of the first transmission power control information (e.g., the third TPC bit in the HS-SCCH is generated based on the sixth pilot signal). It is noted that in a preferred embodiment, the base station may recognize the transmission timing of the first transmission power control information TPCC1 addressed to plural mobile stations, and define and store a time period T that is shorter than the transmission period of the first transmission power control information TPCC1 for the respective mobile stations so that a HS-SCCH and/or a HS-PDSCH addressed to a mobile station may be transmitted to this mobile station before the time period T elapses from the transmission timing of the first transmission power control information TPCC1.

It is noted that the channel HS-PDSCH corresponds to a shared channel, and thereby, data addressed to plural mobile stations may be transmitted via this channel. According to the present embodiment, the HS-PDSCH is arranged to prioritize data transmission to a mobile station at which the elapsed time from a transmission timing of the first transmission power control information TPCC1 is not so long. According to such an arrangement, transmission power control may be effectively realized without including transmission power control information in the HS-SCCH. In one embodiment, the transmission power control information may be omitted for a first HS-SCCH (e.g. a HS-SCCH of which transmission timing interval with respect to a previous HS-SCCH is longer than the transmission period of the first transmission power control information TPCC1), and the transmission power control information may be included in a next HS-SCCH of which the transmission timing interval with respect to a previous HS-SCCH is shorter than the transmission period of the first transmission power control information TPCC1.

In this embodiment, the transmission period of the pilot signal for a mobile station is arranged to be shorter in response to receiving a first HS-SCH, and accordingly, transmission power control may be conducted at shorter intervals. Also, it is noted that in FIG. 6, some of the pilot signals are transmitted in conjunction with the transmission timing of the ACK/NACK signals. By transmitting the ACK signal, the NACK signal, and the pilot signal in sync with the transmission of an uplink signal, transmission efficiency may be realized. Arranging the transmission timing of the pilot signal transmitted in conjunction with the HS-SCCH to be in accordance with the transmission timing of the pilot signal may be one way of improving the transmission efficiency.

It is noted that application of the present invention is not limited to the W-CDMA scheme or the OFDM scheme; rather, the present invention may be equally applied to wireless communication apparatuses and mobile wireless communication systems using other various wireless communication schemes.

Further, the present invention is not limited to the specific embodiments described above, and variations and modifications may be made without departing from the scope of the present invention.

The present application is based on and claims the benefit of the earlier filing date of Japanese priority application No. 2005-007508 filed on Jan. 14, 2005, the entire contents of which are hereby incorporated by reference.

What is claimed is:

1. A mobile wireless communication system comprising:
   a wireless communication apparatus and a counterpart wireless communication apparatus; wherein
   wireless communication is established between the wireless communication apparatus and the counterpart wireless communication apparatus by multiplexing a plurality of channels including at least a traffic channel for transmitting a packet, a control channel for transmitting control information, and a distinct channel for transmitting information including transmission power control information;
   the wireless communication apparatus includes a transmission unit that transmits first transmission power control information directed to the counterpart wireless communication apparatus via the distinct channel at intervals of a prescribed period that is longer than a length of the packet, and transmits the control information within a frame to the counterpart wireless communication apparatus via the control channel when transmitting the packet to the counterpart wireless communication apparatus via the traffic channel, said control information including information on a parameter used in transmitting the packet and second transmission power control information directed to the counterpart wireless communication apparatus; and
   the parameter indicates modulation type information, rate matching process pattern information, retransmission control information, and information indicating whether new data is included.

2. The mobile wireless communication system as claimed in claim 1 wherein:
   the counterpart wireless communication apparatus includes a transmission unit that transmits a pilot signal right before receiving the transmission power control information transmitted from the wireless communication apparatus via the distinct channel and right after receiving the control information transmitted from the wireless communication apparatus via the control channel.

3. The mobile wireless communication system as claimed in claim 2, wherein:
   the transmission power control information transmitted from the wireless communication apparatus to the counterpart wireless communication apparatus includes first transmission power control information that is transmitted via the distinct channel and second transmission power control information that is transmitted via the control channel; and
   the transmission unit of the counterpart wireless communication apparatus transmits the pilot signal at periodic intervals shorter than a transmission period at which the first transmission power control information is transmitted.

4. The mobile wireless communication system as claimed in claim 1, wherein
   the transmission power control information transmitted from the wireless communication apparatus to the counterpart wireless communication apparatus includes first transmission power control information that is transmitted via the distinct channel and second transmission power control information that is transmitted via the control channel; and a transmission power control level represented by the second transmission power control information is arranged to be greater than or equal to a transmission power control level represented by the first transmission power control information.

5. A wireless communication apparatus that is configured to transmit data within a mobile wireless communication system that realizes data transmission via a shared channel, the apparatus comprising:
   a transmission unit that is configured to transmit to a mobile station first transmission power control information at intervals of a prescribed period via a distinct channel, and transmit control information within a frame via a control channel including information on a parameter used in transmitting the data and second transmission power control information when transmitting the data to the mobile station, wherein
   the parameter indicates modulation type information, rate matching process pattern information, retransmission control information, and information indicating whether new data is included.

6. The wireless communication apparatus as claimed in claim 5, wherein a transmission power control level represented by the second transmission power control information that is included in the control information is arranged to be greater than or equal to a transmission power control level represented by the first transmission power control information that is transmitted at intervals of the prescribed period.

7. A wireless communication apparatus that is configured to receive data within a mobile wireless communication system that realizes data transmission via a shared channel, the apparatus comprising:
   a receiving unit that receives information including first transmission power control information at prescribed intervals via a distinct channel and receives, within a frame via a control channel, control information including transmission parameter information and second transmission power control information in accordance with a reception timing of the data; and
   a transmission unit that is configured to transmit a pilot signal in conjunction with receiving the control information, wherein
   the transmission parameter information indicates modulation type information, rate matching process pattern information, retransmission control information, and information indicating whether new data is included.

8. The wireless communication apparatus as claimed in claim 7 wherein:
   the transmission unit is further configured to transmit the pilot signal at intervals of a prescribed period; and
   the transmission of the pilot signal in conjunction with the reception of the control information is conducted at periodic intervals shorter than the prescribed period.

9. A mobile communication system including a mobile station and a base station which executes transmission of a packet to the mobile station, the mobile communication system comprising:
   a transmitter to transmit first transmission power control information via a distinct channel and control information indicating parameters to the mobile station within a frame via a control channel when transmitting the packet to the mobile station via a traffic channel, wherein the parameters include a first parameter applied to the transmission of the packet and a second parameter applied as second transmission power control information to the mobile station;

a receiver which receives information including the first transmission power control information via the distinct channel and the control information within the frame via the control channel and performs a receiving process for the packet transmitted from the base station in accordance with the first parameter; and a controller which controls transmission power of radio signals to be transmitted to the base station from the mobile station in accordance with the second parameter, wherein the first parameter indicates modulation type information, rate matching process pattern information, retransmission control information, and information indicating whether new data is included.

10. The mobile communication system as claimed in claim 9, wherein the radio signals include information indicating a reception result of the packet.

11. The mobile communication system as claimed in claim 9, wherein the base station further transmits a multiplexed transmission power control signal including a plurality of transmission power control signals for a plurality of mobile stations.

12. A base station which executes transmission of a packet to a mobile station, the base station comprising:

a transmitter to transmit first transmission power control information via a distinct channel and control information indicating parameters to the mobile station within a frame via a control channel when transmitting the packet to the mobile station via a traffic channel, wherein the parameters include a first parameter applied to the transmission of the packet and a second parameter applied as second transmission power control information to the mobile station; and a receiver to receive radio signals transmitted from the mobile station which controls transmission power of the radio signals to be transmitted to the base station in accordance with the second parameter, wherein the first parameter indicates modulation type information, rate matching process pattern information, retransmission control information, and information indicating whether new data is included.

13. A mobile station which receives a packet via a traffic channel and parameters from a base station, the mobile station comprising:

a receiver to receive first transmission power control information via a distinct channel and control information within a frame via a control channel, the frame including the parameters wherein the parameters include a first parameter applied to transmission of the packet and a second parameter applied as second transmission power control information to the mobile station; and a transmission power controller to control transmission power of radio signals to be transmitted to the base station in accordance with the second parameter, wherein the first parameter indicates modulation type information, rate matching process pattern information, retransmission control information, and information indicating whether new data is included.

14. The mobile station according to claim 13, wherein the first and second parameters are stored in a same control channel field.

15. The mobile station according to claim 13, wherein the first and second parameters are stored in a frame.

16. A mobile wireless communication system, comprising:

a wireless communication apparatus and a counterpart wireless communication apparatus, wherein:

wireless communication is established between the wireless communication apparatus and the counterpart wireless communication apparatus by multiplexing a plurality of channels including a first channel for transmitting data, a second channel for transmitting control information including a parameter, on transmitting data using the first channel, a first power control information, and a third channel for transmitting information including a second power information; and the parameter indicates modulation scheme information, redundancy version information, retransmission control information, and a new data indicator.

17. A mobile wireless communication system as claimed in claim 16, wherein a first power level represented by the first power control information is arranged to be greater than or equal to a second power level represented by the second power control information.

18. A wireless communication apparatus that is configured to transmit data within a mobile communication system, the apparatus comprising:

a transmission unit that is configured to transmit, to a mobile station, control information including first power control information via a first channel and information including second power information via a second channel, while a data packet is transmitted to the mobile station via a third channel; and the first power information is different from the second power information, wherein said control information includes information on a parameter used in transmitting the data packet and second power information directed, and the parameter indicates modulation type information, rate matching process pattern information, transmission data size information, retransmission control process information, or and information indicating whether new data is included.

19. A wireless communication apparatus as claimed in claim 18, wherein a first power level represented by the first power control information is arranged to be greater than or equal to a second power level represented by the second power control information.

* * * * *